(12) United States Patent
Kaplan et al.

(10) Patent No.: US 8,843,389 B2
(45) Date of Patent: Sep. 23, 2014

(54) MOBILIZED POLLING STATION

(75) Inventors: Elan Kaplan, Carlsbad, CA (US); Aaron Marcus Contorer, Encinitas, CA (US); Michael Lee Joyce, San Diego, CA (US)

(73) Assignee: Everyone Counts, Inc., San Diego, CA (US)

( * ) Notice: Subject to any disclaimer, the term of this patent is extended or adjusted under 35 U.S.C. 154(b) by 0 days.

(21) Appl. No.: 13/531,253

(22) Filed: Jun. 22, 2012

(65) Prior Publication Data

US 2012/0330732 A1 Dec. 27, 2012

Related U.S. Application Data

(60) Provisional application No. 61/500,704, filed on Jun. 24, 2011.

(51) Int. Cl.
*G06F 11/00* (2006.01)
*G06Q 10/00* (2012.01)

(52) U.S. Cl.
CPC .................................... *G06Q 10/00* (2013.01)
USPC .......................................................... 705/12

(58) Field of Classification Search
CPC ................................................ G06Q 2230/00
USPC .......................................................... 705/12
See application file for complete search history.

(56) References Cited

U.S. PATENT DOCUMENTS

| | | |
|---|---|---|
| 3,790,073 A | 2/1974 | Martin et al. |
| 4,641,240 A | 2/1987 | Boram |
| 4,641,241 A | 2/1987 | Boram |
| 4,649,264 A | 3/1987 | Carson |
| 5,218,528 A | 6/1993 | Wise et al. |
| 5,278,753 A | 1/1994 | Graft, III |
| 5,355,414 A | 10/1994 | Hale et al. |
| 5,400,248 A | 3/1995 | Chisholm |
| 5,821,508 A | 10/1998 | Willard |
| 5,875,432 A | 2/1999 | Sehr |
| 5,878,399 A | 3/1999 | Peralto |
| 6,081,793 A | 6/2000 | Challener et al. |
| 6,250,548 B1 * | 6/2001 | McClure et al. ................. 235/51 |

(Continued)

FOREIGN PATENT DOCUMENTS

| | | |
|---|---|---|
| EP | 0292053 A1 | 11/1988 |
| GB | 2448955 A | 11/2008 |

(Continued)

OTHER PUBLICATIONS

"Safevote to Provide Technology for Sweden's First Internet Election", Business Wire, p. 0288; Mar. 15, 2001.

(Continued)

*Primary Examiner* — Charles C Agwumezie

(57) ABSTRACT

A mobilized polling station is deployable for voting in remote locations. The mobilized polling station includes a mobile polling server that stores a voter registration depository identifying potential voters and a ballot repository of blank ballots for the potential voters. Various client devices, such as smart phones, tablets computers, connect to the mobile polling server for voters to enter their credentials, receive the appropriate ballots, and cast their votes. The cast votes are collected by the mobile polling server and then provided to an election center for counting. Versions of mobilized polling station can operate with limited or no power and communications infrastructure.

21 Claims, 3 Drawing Sheets

(56) References Cited

U.S. PATENT DOCUMENTS

| | | |
|---|---|---|
| 6,412,692 B1 | 7/2002 | Miyagawa |
| 6,550,675 B2 | 4/2003 | Davis et al. |
| 6,662,998 B2 | 12/2003 | McClure et al. |
| 6,688,517 B1 | 2/2004 | McClure et al. |
| RE38,637 E | 10/2004 | Willard |
| 6,865,543 B2 | 3/2005 | Gibbs, Sr. |
| 6,968,999 B2 | 11/2005 | Reardon |
| 7,032,821 B2 | 4/2006 | McClure et al. |
| 7,055,742 B2 | 6/2006 | Sinha |
| 7,152,156 B1 | 12/2006 | Babbitt et al. |
| 7,237,717 B1 | 7/2007 | Rao et al. |
| 7,406,480 B2 | 7/2008 | Seibel et al. |
| 7,406,780 B2 | 8/2008 | Doh et al. |
| 7,422,150 B2 * | 9/2008 | Chung ............ 235/386 |
| 7,464,874 B2 | 12/2008 | Donner |
| 7,497,377 B2 | 3/2009 | Watson |
| 7,516,892 B2 | 4/2009 | Haas et al. |
| 7,537,159 B2 | 5/2009 | Mugica et al. |
| 7,565,540 B2 | 7/2009 | Bogasky et al. |
| 7,597,258 B2 | 10/2009 | Feldkamp et al. |
| 7,640,181 B2 | 12/2009 | McClure et al. |
| 2002/0082907 A1 | 6/2002 | Inomata et al. |
| 2002/0128978 A1 | 9/2002 | Neff |
| 2002/0152379 A1 | 10/2002 | Gefwert et al. |
| 2002/0161628 A1 | 10/2002 | Lane Poor et al. |
| 2003/0173404 A1 | 9/2003 | Chung et al. |
| 2004/0024635 A1 | 2/2004 | McClure et al. |
| 2004/0028190 A1 | 2/2004 | Golden |
| 2004/0046021 A1 | 3/2004 | Chung |
| 2004/0128190 A1 | 7/2004 | Campo et al. |
| 2004/0195323 A1 | 10/2004 | Vadura et al. |
| 2005/0145695 A1 | 7/2005 | Kelly |
| 2005/0211778 A1 | 9/2005 | Biddulph |
| 2005/0247783 A1 | 11/2005 | Poulos et al. |
| 2006/0041468 A1 | 2/2006 | Reardon |
| 2006/0060649 A1 | 3/2006 | Brucker et al. |
| 2006/0070119 A1 | 3/2006 | Ogram |
| 2006/0266829 A1 | 11/2006 | Bolton et al. |
| 2007/0007340 A1 | 1/2007 | Mugica et al. |
| 2007/0267493 A1 | 11/2007 | Coutts |
| 2008/0105742 A1 | 5/2008 | Kim et al. |
| 2008/0308633 A1 | 12/2008 | Bolton et al. |
| 2009/0037260 A1 | 2/2009 | Felten et al. |
| 2009/0173778 A1 | 7/2009 | Cummings et al. |
| 2011/0114724 A1 | 5/2011 | Lee |
| 2012/0061468 A1 | 3/2012 | Arnao et al. |
| 2012/0095810 A1* | 4/2012 | Miao et al. ............ 705/12 |
| 2012/0164982 A1* | 6/2012 | Klein ............ 455/411 |
| 2012/0173307 A1 | 7/2012 | Moore et al. |
| 2012/0217299 A1 | 8/2012 | Valles Fontanals et al. |
| 2012/0261470 A1 | 10/2012 | Valles Fontanals et al. |

FOREIGN PATENT DOCUMENTS

| | | |
|---|---|---|
| JP | 2001209834 A | 8/2001 |
| JP | 2002318574 A | 10/2002 |
| JP | 2002352039 A | 12/2002 |
| JP | 2003022343 A | 1/2003 |
| JP | 2003256900 A | 9/2003 |
| KR | 2009-0001497 A | 1/2009 |
| KR | 10-0999346 B1 | 12/2010 |
| WO | WO-2009103014 A2 | 8/2009 |

OTHER PUBLICATIONS

Anonymous, "Simple and secure electronic voting with Pret a Voter", Feb. 28, 2008.

Benaloh, et al., "Receipt-Free Secret-BAllot Elections (Extended Abstract", retrieved from the Internet: : <http://research.microsoft.com/en-us/um/people/benaloh/papers/rfe.ps>.

Benaloh, et al., "STAR-Vote Secure, Transparent, Auditable, and REliable Voting System", PowerPoint Presentation, Jul. 18, 2012.

Benaloh, et al., "STAR-Vote: A Secure, Transparent, Auditable, and Reliable Voting System", retrieved from the Internet: <http://arxiv.org/abs/1211.1904>.

Benaloh, J., "Administrative and Public Verifiability: Can We Have Both?", Jun. 30, 2008, retrieved from the Internet: <<http://static.usenix.org/events/evt08/tech/full_papers/benaloh/benaloh.pdf>.

Boughton, "Maintaining Democratic Values in e-Voting with eVACS", Lecture Notes in Informatics—Proceedings; Electronic Voting 2006; Aug. 2-4, 2006.

Craig et al., "Toward a System of Checks and Balances for Electronic Voting Machines", Proceedings of the 2009 Information Security Curriculum Development Annual Conference, InfoSecCD ' 09.

Derfler et al., "How Networks Work", 7th Ed., Que Corporation, Oct. 18, 2004.

Election Systems and Software, Inc., ES&S Image Manager User's Guide, Mar. 26, 2006.

Electronic Voting, Next Generation Voting Technology—Products Website.

Florida Department of State, Florida Administrative Register & Florida Administrative Code, Notice "1S-2.030 Electronic Transmisison of Absente Ballots", from website www.flrules.org.

International Search Report and The Written Opinion dated Jan. 25, 2013 for PCT/US2012/043825.

International Search Report and Written Opinion from PCT/IB2008/001038 issued Aug. 20, 2008.

Ka-Ping Yee, "Buidling REliable Voting Machine Software", Dissertation submitted to the Graduate Divsion of the University of California, Berkeley in partial fulfillment of the requirements for the degree of Doctor in Philosophy in Computer Science, Fall 2007.

Ka-Ping Yee, "Extending prerendered-interface voting software to support accessability and other ballot features", retrieved from the Internet: <http://static.usenix.org/event/evt07/tech/full_papers/yee/yee_html/>.

Kiayias et al., "An Authentication and Ballot Layout Attack against an Optical Scan Voting Terminal", Proceedings of the USENIX Workshop on Accurate Electronic Voting Technology; 2007.

Office Action in EP 08750857.8 issued Feb. 4, 2010.

Office Action in EP08750857.8 issued Apr. 26, 2013, 4 pages.

PCT International Search Report and Written Opinion dated Jan. 25, 2013, for PCT/US2012/043825.

PCT International Search Report and Written Opinion dated Oct. 30, 2012, for corresponding PCT application No. PCT/US2012/030970.

PCT International Search Report and Written Opinion dated Oct. 30, 2012, for PCT application No. PCT/US2012/030970.

Remmert, M., "Towards European Standards on Electronic Voting", Lecture Notes in Informatics—Proceedings; Electronic Voting in Europe Technology, Law, Politics and Society; Workshop of the ESF TED Programme together with GI and OCG; Jul. 7-9, 2004.

Safevote—Products Website.

White, Ron, "How Computers Work", 9th Ed., Que Corporation, Nov. 14, 2007.

Xenakis et al., "Procedural Security Analysis of Electronic Voting", Proceedings of the 6th international conference on Electronic commerce, pp. 541-546.

XP002456414—Statement in Accordance with the Notice from the European Patent Office (OJ EPO Nov. 2007, 592-593) dated Oct. 1, 2007, 1 page.

International Search Report and Written Opinion dated Sep. 30, 2013 for PCT application No. PCT/US013/049792.

* cited by examiner

MOBILIZED POLLING STATION

CROSS-REFERENCE TO RELATED APPLICATIONS

This application is claims the benefit of U.S. provisional application Ser. No. 61/500,704, filed Jun. 24, 2011, which is hereby incorporated by reference in its entirety.

BACKGROUND

The present invention relates to voting and to systems and methods for mobilized polling stations.

Voting is fundamental to a democracy. But voters located outside their home regions have difficulty voting. For example, soldiers located overseas rely on either primitive polling places provided by the military or on absentee voting by mail. For another example, voters displaced by disasters typically rely on absentee voting by mail.

Mail voting lacks the convenience, security, speed, and error-resistance of in-person or machine-assisted voting. Many mail ballots do not arrive on time, many never arrive at the voter's actual location, and many are spoiled due to uncaught voter errors such as mismarking or overvoting (selecting too many candidates). Voters who were recently displaced, such as by a disaster or a military redeployment, are often not in a position to receive their mail and thus cannot vote.

Thus there is a need for improved polling facilities that can be timely deployed, are error-resistant, and can be used even in remote locations. The improved polling facilities can be used to improve administration of elections so that integrity of the results is assured including that voters' choices are kept secret, eligible voters are allowed to vote for the correct contests, and all votes are timely and accurately counted.

SUMMARY

Systems and methods for mobilized polling stations are provided. In one aspect, the invention provides a method for voting using a mobilized polling station, the method comprising: receiving voter credentials from a user via a client device; authenticating the voter credentials by querying a voter registration repository, the voter registration repository storing voter authentication information for a plurality of jurisdictions; assigning a ballot style to the user from a ballot repository taking into account the determined authentication, the ballot repository storing ballot styles for the plurality of jurisdictions; presenting a ballot based on the assigned ballot style to the user on the client device; collecting cast votes from the user via the client device; and storing the cast votes in a ballot box.

In one aspect, the invention provides a mobilized polling station, comprising: a mobile polling server configured to receive voter credentials from a user via a client device, authenticate the voter credentials using a voter registration repository, the voter registration repository storing voter authentication information for a plurality of jurisdictions, assign a ballot style to the user from a ballot repository, the ballot repository storing ballot styles for the plurality of jurisdictions, present a ballot based on the assigned ballot style to the user on the client device, collect cast votes from the user via the client device, and store the cast votes in a ballot box; and a networking device configured to communicate with the mobile polling server and client devices.

In one aspect, the invention provides a mobilized polling station, comprising: a voter authentication module configured to receive identification information from voters and to authenticate eligibility of the voters, wherein the voters may be from a plurality of jurisdictions; a ballot assignment module configured to determines ballot styles to be used by the authenticated voters; and a vote processing module configured to process votes cast by the voters.

Other features and advantages of the present invention should be apparent from the following description which illustrates, by way of example, aspects of the invention.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Figure 1:
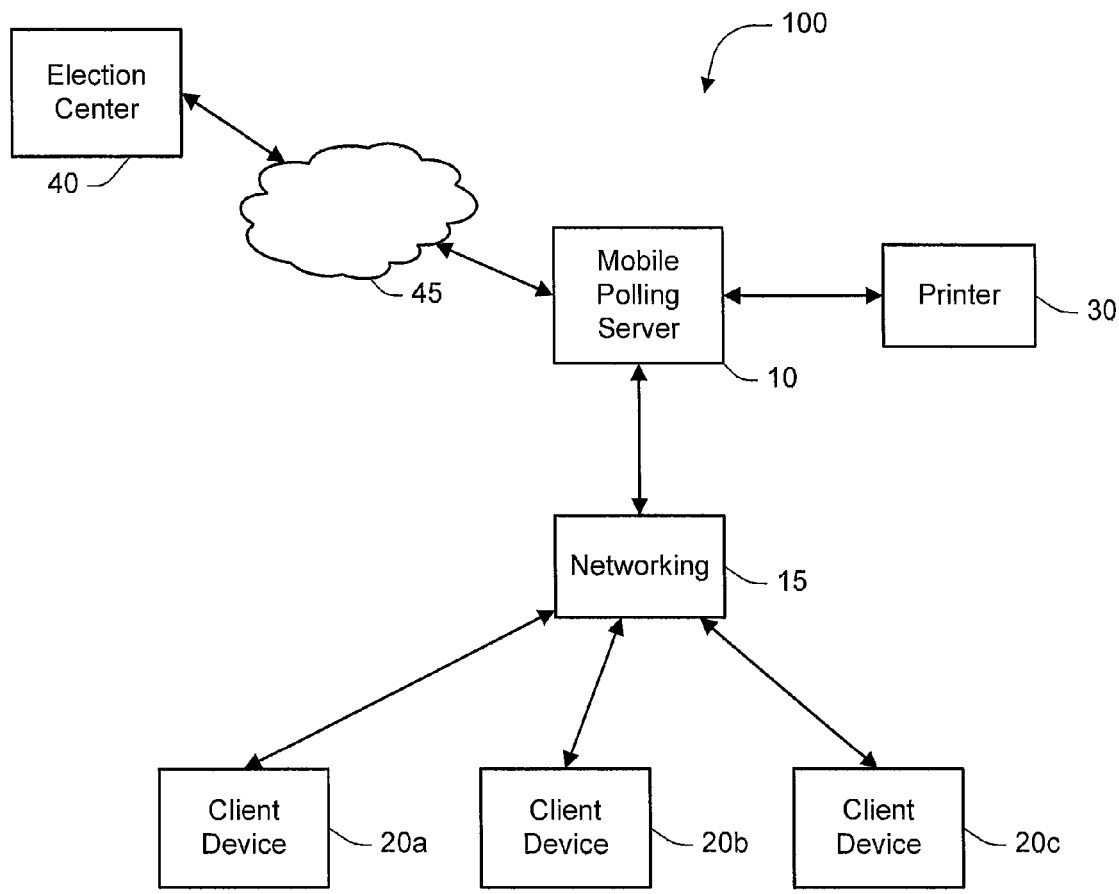
FIG. 1 is a block diagram of a voting system with a mobilized polling station in accordance with aspects of the invention.

FIG. 1 is a block diagram of a voting system with a mobilized polling station 100. The mobilized polling station 100 uses modern information technology to provide a reliable, secure, rapid, and easy way for voters to cast their ballots. The information technology may include, for example, notebook computers, mobile phones, tablet computers, and other computing and communication devices. The mobilized polling station can be quickly and easily transported and put into operation. It is suitable for use in a semi-insecure environment, such as a forward military base. It may tolerate faults, for example, problems with telecommunications, electrical power, and availability of trained personnel. It may also be immune to theft, equipment failure, and localized disaster or military attack.

The many administration problems inherent in a remote polling place are directly addressed by mobilized polling stations. For example, the mobilized polling stations can keep ballots up-to-date, access up-to-date voter authentication information, and support voters from multiple jurisdictions that use different styles of authentication and ballots.

Embodiments of mobilized polling stations scale from very small deployments (for example, one hardware component) to medium deployments (for example, one notebook computer server and several mobile client devices) to large deployments (for example, many computers and many different client and user devices). The mobilized polling stations are also deployable in locations with infrastructure ranging from no power and no telecommunications capability to locations with limited power and slow or intermittent telecommunications links to locations with modern and reliable power and telecommunications capabilities.

The mobilized polling station 100 illustrated in FIG. 1 includes a mobile polling server 10. The mobile polling server 10 may be, for example, a notebook computer. Other computing devices may also be used. The mobile polling server 10, by way of introduction, receives voter credentials, authenticates voter eligibility, supplies appropriate ballots to voters, receives contest selections from the voters, and keeps the votes in a ballot box for tabulation.

Client devices 20 are coupled to the mobile polling server 10 by a networking device 15. Although FIG. 1 illustrates three client devices, the number of client devices may vary and the client devices may be of various types. For example, a first client device 20a may be a smart phone, a second client device 20b may be a notebook computer, and a third client device 20c may be a personal digital device or an ebook reader. Other client devices may be custom devices specifically built for voting. Many client devices 20 operate using a web browser. Other client devices operate using a voting application program, sometimes called an "app." Some client devices may use voice-activated systems. The client devices 20, by way of introduction, are used by voters to enter their credentials, view ballots, and select choices for contests on the ballots.

The networking device 15 may be a wireless router such as an 802.11 or Wi-Fi device. Other types of networking devices may be used depending on the networking capabilities of the mobile polling server 10 and the client devices 20. For example, the networking device 15 may be a cellular base station, for example, a picocell or other small form factor base station, for use with mobile phone clients. Many other communication methods, both wired and wireless, may be used alternatively or additionally. In some embodiments, the networking device 15 is preexisting at a polling location.

The mobilized polling station 100 may include a connection to an election center 40 via a telecommunications network 45. The election center 40 can provide information about voter eligibility and corresponding ballots for the mobilized polling station 100. The election center 40 can also collect voted ballots from the mobilized polling station 100. Although represented as one element in FIG. 1, the election center 40 may include many physical devices distributed over multiple locations. In an embodiment, the election center 40 includes networked computer servers. The servers may be configured to run the eLect Today suite of election software from Everyone Counts, Inc. The same or similar software may run on the mobile polling server 10. Aspects of example systems and methods of an election center are described in U.S. patent application Ser. No. 12/597,717, filed Oct. 26, 2009, which is hereby incorporated by reference in its entirety.

The telecommunications network 45 may be, for example, the Internet or public switched telephone network. In other embodiments, the telecommunications network 45 may be a local area network (LAN), a metropolitan area network (MAN), a wide area network (WAN), a virtual private network (VPN), or other network variety. Additionally, the connection to the telecommunications network 45 may be directly to the mobile polling server 10 or via the networking device 15.

Communication between the mobilized polling station 100 and the election center 40, in various implementations, can occur before, during, or after deployment of the mobilized polling station 100 to a polling location. Accordingly, the mobilized polling station 100 can be used for polling with or without a connection to the telecommunications network 45.

In an embodiment, the mobilized polling station will use the telecommunications network 45 when available but continue functioning without interruption (using the local mobile polling server 10) as the connection to the telecommunications network comes into or out of service. This facilitates use at locations with no telecommunications link or with an unreliable link. The mobilized polling station may also operate from the election center 40 when a reliable telecommunications link is present. The mobilized polling station can switch between the various operational states without being reconfigured.

The mobilized polling station 100 may include a printer 30 in some embodiments. The printer 30 is coupled to the mobile polling server 10 directly or via another device, for example, the networking device 15. The printer 30 may be used to print paper ballots. The paper ballots can be blank ballots for voter completion or can be completed ballots that are printed, for example, for verification or tabulation. A printed ballot may include machine-readable indicia that encodes information about the ballot. Aspects of such ballots are described in U.S. patent application Ser. No. 13/433,042, filed Mar. 28, 2012, which is hereby incorporated by reference in its entirety. The printer may also be used to print other documents, for example, tabulations of cast ballots or affidavits for voter affirmation. In some embodiments, the client devices 20 may print cast ballots on the printer 30 without the ballots being collected by the mobile polling server 10.

In some embodiments, the various electronic devices within the mobilized polling station 100 are equipped with batteries. The batteries can power the mobilized polling station during intermittent power outages or for use at a polling location without power.

The mobilized polling station 100, in an embodiment, is transported as a package including all components. In another embodiment, the mobilized polling station does not ship with all the shown devices, but instead, includes facilities to network with devices already found at the voting location, such as preexisting computers, phones, or tablets. The package may be a highly-deployable container, such as a parachute-deliverable or helicopter-portable container, for rapid delivery. The mobilized polling station 100 may also be configured as a kiosk.

The mobilized polling station 100 uses a voter registration repository to authenticate whether perspective voters are eligible to vote. The voter registration repository can include an indication of what ballot style, that is, what contests are available, each eligible voter is to use. A ballot repository stores a blank ballot for each ballot style. In various embodiments, the blank ballots may be stored as data about contests from which ballots are created, as complete ballots, or some intermediate form. The mobilized polling station 100 stores completed ballots in a ballot box.

The ballot box may be a digital ballot box or a paper ballot box. A digital ballot box can be easily replicated, encrypted, transmitted to an election center, tabulated, and checked for errors. The digital ballot box may also use cryptographic techniques to encrypt ballot data and digitally sign ballots. A paper ballot box can store printed ballots. The printing may be performed at the mobilized polling station 100 or at another location such as the election center 40, which may be more secure or more central to other polling locations. A paper ballot box can provide direct inspectability, easy understanding, familiarity to voters, resistance to electromagnetic erasure, compatibility with preexisting optical scan tabulation systems, and compliance with laws that may require paper ballots. In some embodiments, the voting system includes a digital ballot box and a paper ballot box.

The voter registration repository, the ballot repository, and the ballot box may be kept at the mobilized polling station 100, for example, stored on a disk drive in the mobile polling server 10, at the election center 40, or at a combination of locations.

In various embodiments, the different components of the mobilized polling station may exist is different quantities. There may be a single instance or multiple, replicated instances of a component. Multiple instances may provide increased capacity. Multiple instances can also provide increased fault tolerance. Additionally, the various functions may be distributed in different ways. Some components may be implemented as virtual components that share common hardware. For example, the ballot repository and the voter registration repository may be implemented using software on the same computer and store their data on the same data storage drive. For another example, the mobile polling server 10 and the client device 20 may be in the same notebook computer with the networking device 15 being a socket that provide communication between processes (or virtual machines) that are the mobile polling server 10 and the client device 20. Additionally, the functions of the mobilized polling station may be differently distributed or combined.

In an embodiment, the mobilized polling station 100 is configured to allow an operator to determine whether to deploy a complete system to a polling location or to deploy a partial system to a polling location and use the telecommunications network 45 to access other components. For example, the voter registration repository may be located at the election center 40 and the ballot repository may be located at the mobilized polling station 100. Flexibility in configurations can allow the mobilized polling station 100 to be adapted to the characteristics of a polling location. Components of the mobilized polling station may automatically operate in the various possible configurations.

When a mobilized polling station is deployed to a polling location, set up of the station is simple. Often all that is required is to move the components to their desired locations and turn them on. In an example embodiment, the set up instructions are: (1) Connect power cords from the mobile polling server and the networking device to a power strip; (2) Plug in and turn on the power strip; (3) Turn on the networking device. Wait approximately one minute for blue wireless indicator to illuminate on the networking device; (4) Open lid on the mobile polling server and press power button. Wait approximately two minutes for mobile polling server to boot and display ready indication on display screen; and (5) Use client devices for voting.

The networking device 15 and devices that connect to the networking device 15 (e.g., the mobile polling server 10 and the client devices 20) may include dynamic configuration capabilities (such as Dynamic Host Configuration Protocol). This can allow the components to automatically connect once powered on. Additional components can be added to the mobilized polling station and self-configure. Similarly, the interface to the telecommunications network 45 may be pre-configured before deployment of the mobilized polling station to connect to a particular remote network. Thus, personnel at the polling location do not need such expertise.

The mobilized polling station 100 may be configured to determine whether a perspective client device will be allowed to connect to the mobilized polling station for use by a voter. The perspective client device may be required to demonstrate that it possesses a device credential before connecting. The device credential may be a security certificate. The security certificate may be stored, for example, on a smart card or a universal serial bus (USB) device. Requiring device credentials may prevent malicious devices from connecting to the mobilized polling station 100 while allowing new client device to be used.

The mobilized polling station, in an embodiment, is configured to require client devices to demonstrate that they have booted from known good boot media. This can also prevent use of client devices that could have been tampered with. In an embodiment, the mobilized polling station provides software for certain devices to allow those devices to be used by voters as client devices. The software may be downloaded via the networking device 15.

When a client device initially connects to the networking device 15, any web browsing action may be redirected to a landing page of the mobilized polling station. The landing page can be the home or first page for web-based voting. Landing-page redirection allows client devices to be used for voting without the voter knowing and entering a specific address. This can reduce configuration, training, and potential for error. The automatic connection of previously unknown client devices and redirection to a polling landing page allows existing devices, such a soldier's mobile phone, to be easily used for voting.

Figure 2:
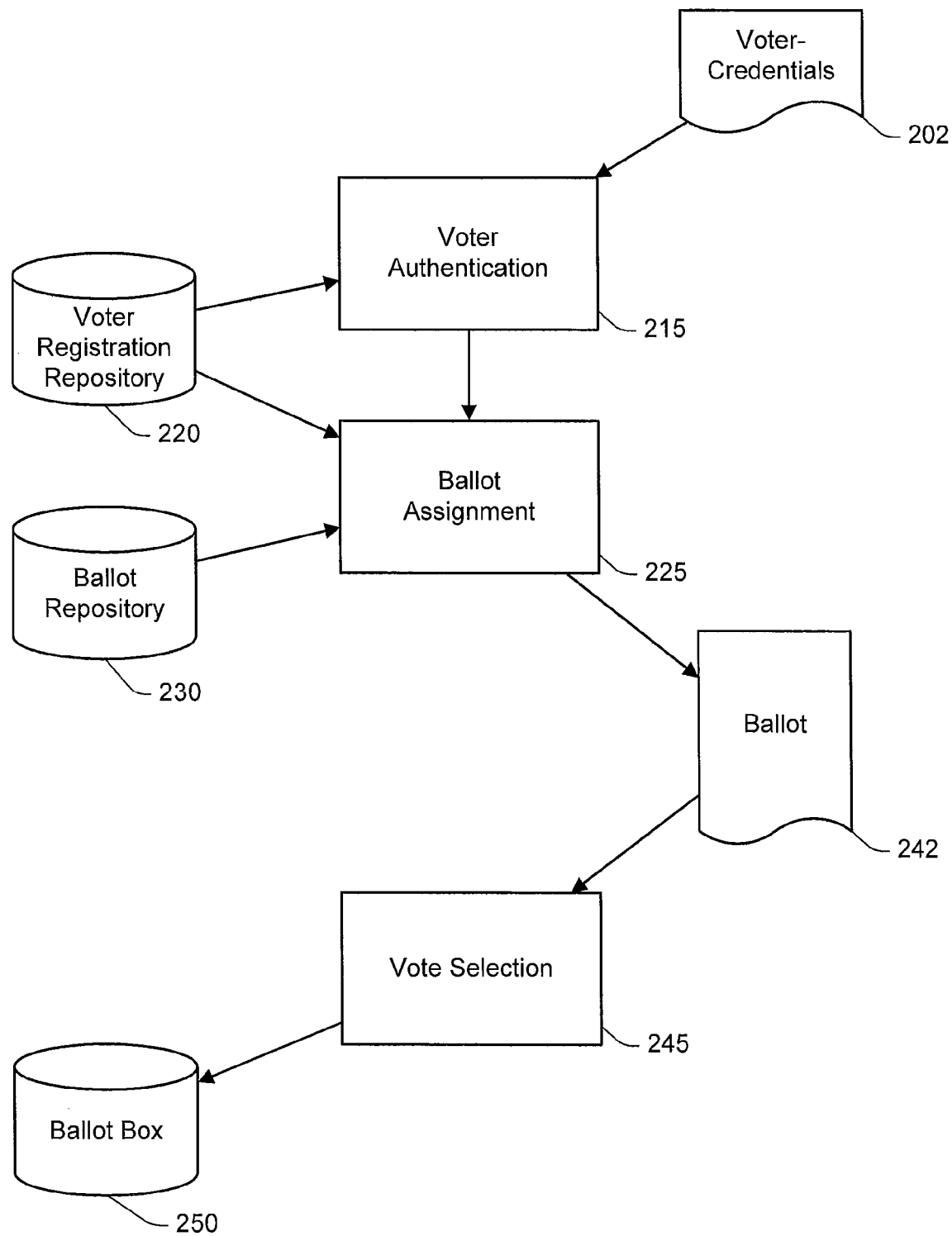
FIG. 2 is a diagram illustrating operations of a mobilized polling station in accordance with aspects of the invention.

FIG. 2 is a diagram illustrating operations of a mobilized polling station. When one of the client devices 20 accesses the election server 10, the user of the device may be provided a login page. The user—a perspective voter—provides voter credentials 202. The voter credentials 202 are used by the mobilized polling station 100 to determine whether the user is authorized to vote and, if authorized, in what contests the user may vote.

Voter authentication 215 and ballot assignment 225 are two related processes performed by the mobilized polling station 100. The voter authentication process 215 uses the voter credentials 202 and a voter registration repository 220. The voter registration repository 220 has a record of each voter who may vote using the mobilized polling station 100. The voter registration repository 220 may include information for all voters in a jurisdiction, such as county or state, or all voters for a country. Alternatively, the information may be limited to a subset of all voters, for example, all voters who requested absentee ballots or all voters deployed at a military base.

The voter authentication process 215 may be viewed as looking up the voter credentials 202 received from the user in the voter registration repository 220. In an embodiment, the mobilized polling station 100 first establishes the perspective voter's identity and compares the identity to records indicating who is authorized to vote. The mobilized polling station 100 may use identification that is not specifically for voting, for example, a federal or military identification and map that identification to one or more state-specific databases to determine state-specific voting registration status for the user. In an embodiment, the mobilized polling station 100 allows voters from different jurisdictions (for example, states) to identify themselves using jurisdiction-specific credentials and registration data. This can facilitate voters from different jurisdictions voting at the same mobilized polling station 100 with each voter receiving the correct ballot style.

The voter credentials 202 may be in many different forms, for example, depending on the laws of the relevant jurisdiction. The mobilized polling station 100, in an embodiment, uses two-factor authentication. Two-factor authentication uses at least two out of three categories of authentication: knowledge of the user, a possession of the user, and a characteristic of the user. Examples of knowledge of the user include passwords, names, social security numbers, dates of birth, zip codes, and personal identification or registration numbers issued by an election authority. Some knowledge items may be sent to voters prior to the election, for example, via email or postal mail. Example possessions of the user include identification cards, such as smart cards. Example characteristics of the user include biometric characteristics, such as fingerprints. The mobilized polling station 100 includes sensors, readers, and the like appropriate for the categories of authentication used. The mobilized polling station 100, in other embodiments, may use just one of the items that could be used in two-factor authentication. For example, a voter may simply provide his or her address as the voter credentials 202. The mobilized polling station 100, in an embodiment, may use inputs from a poll worker who determines voter authentication.

In an embodiment, the mobilized polling station 100 uses the Common Access Card (CAC), a smart card used by the U.S. Department of Defense. The voting system could use identifying information from the CAC card to look up the user's voting credentials in a common database. Other national identification-type cards may also be used.

In an embodiment, the mobilized polling station 100 is configured to automatically ask for the appropriate voter credentials based on the voter's state of residence and the laws of that state. For example, one state may require scanning of a photo ID of the voter, while another state may ban asking for a photo ID.

In an embodiment, the mobilized polling station 100 transmits voter credentials to a remote inspector, for example, at the election center 40. A scan of a photo ID, for example, may be captured and transmitted to an operator for acceptance before the voter is allowed to vote or for later approval before the voter's ballot is admitted for tabulation. Whether acceptance of a user's credentials occurs before voting or before tabulation of the votes may switch dynamically, for example, depending on current communication capabilities.

The amount of association that exists between voters and their identification information may vary depending on the laws or rules of the relevant voting authority. At one limit, the mobilized polling station 100 examines inputs to directly determine an authorization to vote without establishing the voter's identity. At an opposite limit, the mobilized polling station 100 may determine the voter's full identity.

The mobilized polling station 100 uses a ballot repository 230 and information from the voter authentication process 215 for ballot assignment. The ballot repository 230 stores ballots for the different contests available in an election. The ballot repository 230 may also store formatting information for how the ballot information is to be presented to voters. The ballot repository 230 can include repositories for multiple jurisdictions (for example, all states and territories). The data may be stored as Election Management System (EMS) files.

The ballot styles include information on contests that are available to voters and choices available in the contests. The ballot styles may also include formatting information for how the ballot information is to be presented. After assigning the proper ballot style for the voter, the mobilized polling station 100 can format the information for presentation to the voter on one of the client devices 20. Additional description of ballot creation is given in application Ser. No. 13/433,042.

The number of ballot styles may be large since voters may be eligible to vote in contest for a hierarchy of governmental (and sometimes nongovernmental) entities, for example, federal, state, county, city, and school district contests. Additionally, voter eligibility may vary with a party registration of the voter.

The ballot assignment process 225 determines what ballot 242 will be presented to the voter. The ballot assignment process 225 includes assessing one or more data items regarding the voter and data determining which ballot style from the ballot repository 230 should be presented. The process may use an "address ballot locator" in which voter-provided address information is used to determine the correct ballot based on where the voter lives. Alternatively, the correct ballot may be determined by looking up the voter's identifying information in the voter registration repository 220, which can indicate the voter's precinct, district, or ballot style. Additionally or alternatively, the process may accept direct input from the voter of a precinct, district, or ballot identifier.

The mobilized polling station 100 may use combinations of voter registration repositories and ballot repositories. For example, a user may present credentials in the form of an identification that is not specific to a voting jurisdiction. The mobilized polling station 100 may authenticate the user in a voter registration repository that identifies the jurisdiction for the user. The mobilized polling station 100 may then use a ballot repository that is specific to the identified jurisdiction. An a variation, the mobilized polling station 100 may use the presented credential to look up the user in a common database that contains information that identifies a jurisdiction-specific voter registration repository to be used.

During vote selection 245, the voter uses the client device 20 to make his or her choices on the ballot 242. The choices may be made, in various embodiments, by way of a web page where the voter can fill out choices, or an editable form that the user can fill out, such as a PDF document. When the voter finishes vote selection 245, the cast ballot is submitted to a ballot box 250.

The mobilized polling station 100 can store the ballot box 250 in digital form, for example, on a disk drive or flash memory card. In an embodiment, the ballot box 250 is a replicated store, that is, copies of the data are stored on two or more separate storage devices, and when a change is made, the various copies are updated. One or more of the copies may be remote from the polling location. For example, data for the ballot box 250 may be sent to the election center 40 via the telecommunications network 45. The data may be sent to the remote copy of the ballot box, for example, as votes are cast, periodically, or when communication to the remote copy is available. This can provide disaster tolerance so that even if the mobilized polling station 100 were destroyed, ballots already cast are not lost. Using copies of ballot boxes may be configured automatically based on characteristics of the polling location.

Data in the ballot box is generally encrypted to prevent unauthorized access in the event of physical theft of a storage device or a breach of communications with the mobilized polling station 100. Also, devices of the mobilized polling station 100 may include "phone home" functions so that, if stolen or lost and later reconnected to a network, the device will contact another device and provide information about its status, including its location if available. The phone home function could also transmit ballot data to an authorized receiver.

After voting closes, votes are gathered from the mobilized polling station 100. In various implementations, the gathering may include collecting the actual voted ballots, a tabulation of the votes, or both. Gathering may be done, for example, via the telecommunications network 45 or via physical collection of one or more ballot boxes 250. Gathering can also be done by taking the entire mobilized polling station 100 to an election facility. Votes may also be gathered while voting is ongoing.

Cast ballots may be cryptographically sealed. This can include both encryption of data and use of cryptographic signatures. The cryptography may use public keys, private keys, or a combination of key types. The ballots may be digitally processed using techniques analogous to sealing paper ballots in signed envelopes where the envelope may be associated with a voter but that association is removed when the contents of the envelope are revealed. This scheme can aid in allowing ballots to be cast without real time authentication of voters. For example, an election center can process ballots that may lack authentication or have other irregularities after collection of ballot boxes from the various polling stations that may be in use for an election. Irregularities, for example, multiple ballots from the same voter, can be processed according to the applicable law.

In some embodiments, the mobile polling server 10 logs all or selected events including time-stamps. In some embodiments, a portable storage device maintains configuration and state information for the mobile polling server 10. The portable storage device could be moved to a replacement server in the event of failure of a first server.

Figure 3:
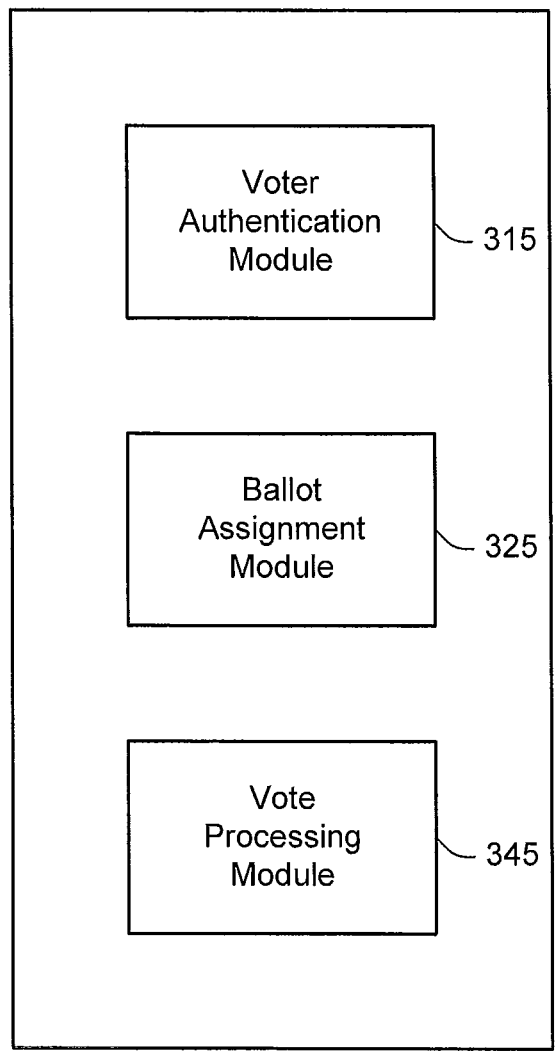
FIG. 3 is a functional block diagram of a mobilized polling station in accordance with aspects of the invention.

FIG. 3 is a functional block diagram of a mobilized polling station in accordance with aspects of the invention. The mobilized polling station of may be used in the voting system of FIG. 1 and may perform operations described with reference to FIG. 2. The mobilized polling station of FIG. 3 includes a voter authentication module 315. The voter authentication module 315 receives credentials (identification information) from voters and uses the credentials to determine whether the voter is authorized to vote in a particular election. The voter authentication module 315 may query one or more voter registration repositories regarding the identified voter to determine the authorization.

The mobilized polling station also includes a ballot assignment module 325. The ballot assignment module 325 determines what ballot should be presented to the voter. The ballot to be presented may be determined by querying one or more voter ballot repositories. The query may use information from the voter authentication module 315, such as the credentials or information from the voter registration repositories.

The mobilized polling station also includes a vote processing module 335. The vote processing module 335 present the ballot to the voter and receives cast votes. The vote processing module 335 may place the cast votes in one or more ballot boxes. The vote processing module 335 may perform tabulation operations on the cast votes.

The disclosed voting system using a mobilized polling station overcomes many problems and limitation of prior voting systems. The voting system can be used at military polling places which otherwise could lack the ability to deliver customized ballots representing the accurate list of races and candidates from a wide range of locations, could lack complete voter registration lists from all participating states and counties; and lack the ability to correctly authenticate or correctly not authenticate voters as called for by each jurisdiction's respective laws.

The disclosed voting system can be set up at a remote or overseas polling place without barriers caused by problems of security, transportation, setup, management, and reliability. Prior voting schemes have required substantial equipment and expertise. The disclosed voting system is usable with different states that use different ballots, different voter registration lists, and different rules for sign-in and voting. The voting system easily serves a mixed population of voters who come from various jurisdictions.

The disclosed voting system can also be used by voters in their home regions. For example when traditional polling facilities are inadequate. This could happen, for example, when voter participation is higher than predicted or if a disaster puts some polling places out of operation or displaces voters.

Although this disclosure generally describes voting for U.S. political elections, the systems and method described are applicable in many fields.

Those of skill will appreciate that the various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the design constraints imposed on the overall system. Skilled persons can implement the described functionality in varying ways for each particular application, but such implementation decisions should not be interpreted as causing a departure from the scope of the invention. In addition, the grouping of functions within a module, block, or step is for ease of description. Specific functions or steps can be moved from one module or block without departing from the invention.

The various illustrative logical blocks and modules described in connection with the embodiments disclosed herein can be implemented or performed with a general or special purpose processor, an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

The steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium. An exemplary storage medium can be coupled to the processor such that the processor can read information from, and write information to, the storage medium. In the alternative, the storage medium can be integral to the processor. The processor and the storage medium can reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter, which is broadly contemplated by the present invention. It is further understood that the scope of the present invention fully encompasses other embodiments that may become obvious to those skilled in the art and that the scope of the present invention is accordingly limited by nothing other than the appended claims.

What is claimed is:

1. A method for voting using a mobilized polling station, the method comprising:
   storing voter authentication information for a plurality of jurisdictions in a voter registration repository associated with one or more state specific databases;
   storing ballot styles for the plurality of jurisdictions in a ballot repository;
   receiving an indication of a state of residency associated with a user via a client device;

prompting the user for jurisdiction specific voter credentials based on the state of residency of the user, the jurisdiction specific voter credentials identifying one or more types of identification required by the state of residency of the user and stored in at least one of the state specific databases;

receiving the jurisdiction specific voter credentials from the user via the client device;

authenticating the jurisdiction specific voter credentials by querying the voter registration repository;

assigning a ballot style to the user from the ballot repository taking into account the determined authentication;

presenting a ballot based on the assigned ballot style to the user on the client device;

collecting cast votes from the user via the client device; and storing the cast votes in a ballot box, wherein the storing of voter authentication information, the storing of ballot styles, the receiving, the authenticating, the assigning, the presenting, the collecting, and the storing of cast votes are performed by at least one processor.

2. The method of claim 1, wherein the jurisdiction specific voter credentials are received in formats based on a relevant one of the plurality of jurisdictions.

3. The method of claim 1, wherein the jurisdiction specific voter credentials are an address of the user.

4. The method of claim 1, wherein the voter registration repository is accessed via a telecommunications network.

5. The method of claim 1, wherein the ballot repository is accessed via a telecommunications network.

6. The method of claim 1, wherein the ballot box is replicated in a plurality of copies.

7. The method of claim 6, wherein at least one of the plurality of copies is remote from the mobilized polling station.

8. The method of claim 1, further comprising redirecting the client device to a landing page for voting when the client device first connects to a network of the mobilized polling station.

9. The method of claim 1, wherein the authenticating the jurisdiction specific voter credentials is performed after the collecting of cast votes, and wherein the cast votes are not admitted for tabulation when the authenticating fails.

10. A mobilized polling station, comprising:

a voter registration repository storing voter authentication information for a plurality of jurisdictions, the voter registration repository associated with one or more state specific databases;

a ballot repository storing ballot styles for the plurality of jurisdictions;

a mobile polling server having at least one processor that at least receives an indication of a state of residency associated with a user via a client device, prompts the user for jurisdiction specific voter credentials based on the state of residency of the user, the jurisdiction specific voter credentials identifying one or more types of identification required by the state of residency of the user and stored in at least one of the state specific databases, receives the jurisdiction specific voter credentials from the user via the client device, authenticates the jurisdiction specific voter credentials using the voter registration repository, assigns a ballot style to the user from the ballot repository, presents a ballot based on the assigned ballot style to the user on the client device, collects cast votes from the user via the client device, and stores the cast votes in a ballot box; and a networking device that at least communicates with the mobile polling server and client devices.

11. The mobilized polling station of claim 10, further comprising a printer, wherein the mobile polling server prints ballots using the printer.

12. The mobilized polling station of claim 10, wherein the networking device is a Wi-Fi device.

13. The mobilized polling station of claim 10, wherein the client device is chosen from a group consisting of smart phones, tablet computers, and ebook readers.

14. The mobilized polling station of claim 10, wherein the client device connects to the mobilized polling station using device credentials.

15. The mobilized polling station of claim 10, wherein the client device, the networking device, and the mobile polling server are automatically connected.

16. The mobilized polling station of claim 10, wherein the mobilized polling station is arranged as a kiosk.

17. The mobilized polling station of claim 10, further comprising an interface to a telecommunications link for communications with an election center.

18. The mobilized polling station of claim 17, wherein the mobile polling server operates when the telecommunications link is intermittently operable.

19. A mobilized polling station, comprising:

a voter registration repository having voter authentication information for a plurality of jurisdictions, the voter registration repository associated with one or more state specific databases;

a ballot repository having ballot styles for the plurality of jurisdictions;

a voter authenticator that at least receives from voters an indication of a state of residency associated with the voters via one or more client devices, the voters residing in the plurality of jurisdictions, prompts the voters for jurisdiction specific identification information based on the state of residency of the voters, the jurisdiction specific identification information identifying one or more types of identification required by the state of residency of the voters and stored in at least one of the state specific databases, receives jurisdiction specific identification information from the voters, and compares the received jurisdiction specific identification information to voter authentication information stored in the voter registration repository;

a ballot assigner that at least determines ballot styles to be used by the authenticated voters, the ballot styles stored in the ballot repository;

a vote processor that at least processes votes cast by the voters using the determined ballot styles; and at least one processor comprising the voter registration repository, the ballot repository, the voter authenticator, the ballot assigner, and the vote processor.

20. A mobilized polling station, comprising:

a voter registration repository storing voter authentication information for a plurality of jurisdictions, the voter registration repository associated with one or more state specific databases;

a ballot repository storing ballot styles for the plurality of jurisdictions;

a mobile polling server having at least one processor that at least
- receives an indication of a state of residency associated with a user via a client device,
- prompts the user for jurisdiction specific voter credentials based on the state of residency of the user, the jurisdiction specific voter credentials identifying one or more types of identification required by the state of residency of the user and stored in at least one of the state specific databases,
- receives jurisdiction specific voter credentials from the user via the client device,
- authenticates the jurisdiction specific voter credentials using the voter registration repository,
- assigns a ballot style to the user from the ballot repository,
- presents a ballot based on the assigned ballot style to the user on the client device,
- collects cast votes from the user via the client device, and stores the cast votes in a ballot box; and a networking device that at least communicates with the mobile polling server and client devices,
wherein the voter registration repository and the ballot repository reside within the mobilized polling station.

21. A non-transitory computer-readable medium containing instructions that when executed by a processor causes the processor to perform operations comprising:

- storing voter authentication information for a plurality of jurisdictions in a voter registration repository associated with one or more state specific databases;
- storing ballot styles for the plurality of jurisdictions in a ballot repository;
- receiving an indication of a state of residency associated with a user via a client device;
- prompting the user for jurisdiction specific voter credentials based on the state of residency of the user, the jurisdiction specific voter credentials identifying one or more types of identification required by the state of residency of the user and stored in at least one of the state specific databases;
- receiving the jurisdiction specific voter credentials from the user via the client device;
- authenticating the jurisdiction specific voter credentials by querying the voter registration repository;
- assigning a ballot style to the user from the ballot repository taking into account the determined authentication;
- presenting a ballot based on the assigned ballot style to the user on the client device;
- collecting cast votes from the user via the client device; and
- storing the cast votes in a ballot box.

* * * * *